United States Patent [19]

Krauss et al.

[11] 4,414,176
[45] Nov. 8, 1983

[54] FIRST WALL AND LIMITER SURFACES FOR PLASMA DEVICES

[75] Inventors: Alan R. Krauss, Plainfield; Dieter M. Gruen, Downers Grove, both of Ill.

[73] Assignee: The United States of America as represented by the United States Department of Energy, Washington, D.C.

[21] Appl. No.: 269,235

[22] Filed: Jun. 1, 1981

[51] Int. Cl.³ .............................................. G21B 1/00
[52] U.S. Cl. .................................... 376/136; 376/150
[58] Field of Search .......................... 204/192 E, 298; 376/125, 136, 150

[56] References Cited

U.S. PATENT DOCUMENTS 3,677,326  7/1972  Grosse .................................. 376/136
4,260,455  4/1981  Moir ..................................... 376/136

OTHER PUBLICATIONS

Intor, Zero Phase (12/79) IAEA, pp. 324-329, Vienna.
Journal of Nuclear Materials (76 & 77), (1978), pp. 199-201, 608-610, 612-613, McCraken et al., North Holland Pub. Co.
J. Nucl. Materials (85 & 86), (1979), pp. 1179-1833, Krauss et al. (I).
Surface Science 90, (1979), pp. 564-578, Krauss et al. (II).

*Primary Examiner*—Sal Cangialosi
*Attorney, Agent, or Firm*—William Lohff; Bruce R. Mansfield; Richard G. Besha

[57] ABSTRACT

For a plasma device, a surface of a first wall or limiter with reduced loss of metal by erosion is provided by forming a monolayer of an alkali or alkaline earth metal on a substrate of a more negative metal. The surface exhibits a reduced loss of metal by erosion and particularly by sputtering and an increased secondary ion/neutral ratio resulting in a greater return of atoms escaping from the surface. In another aspect of the invention, the substrate includes a portion of the second metal and serves to replenish the surface layer with atoms of the second metal. In one process associated with self-generating desired surface, the metals as an alloy are selected to provide a first layer having a high concentration of the second metal in contrast to a very low concentration in the second layer and bulk to result in a surface with a monolayer of the second metal. When the combination of metals results in an intermetallic compound, selective removal of the first metal during an initial bombardment stage provides the surface layer with a predominance of the second metal.

22 Claims, 5 Drawing Figures

FIRST WALL AND LIMITER SURFACES FOR PLASMA DEVICES

CONTRACTUAL ORIGIN OF THE INVENTION

The United States Government has rights in this invention pursuant to Contract No. W-31-109-ENG-38 between the U.S. Department of Energy and the University of Chicago representing Argonne National Laboratory.

BACKGROUND OF THE INVENTION

This invention relates to improved metal surfaces for the first wall and limiter in a plasma device and more particularly to metal surfaces with reduced loss of metal by erosion and particularly by sputtering during exposure to the plasma. In a second aspect of the invention, it relates to a metallic substrate containing an amount of the surface metal and providing a self-sustaining source of the surface metal.

In a plasma device, plasma at an elevated temperature is magnetically confined within the first wall whose purpose is to limit the travel of particles escaping from the plasma. The limiter also serves to locate the plasma. During exposure to the hot plasma including bombardment by particles escaping from the plasma, surfaces of the first wall and limiter are subject to loss of material by erosion and particularly by sputtering. In the past, these surfaces have been constructed of metals such as stainless steel. Refractory materials such as ceramic and graphite coatings could also be useful. With ceramic materials, the extreme temperature changes may cause cracks to form and spallation to occur and therefore limit the effectiveness of the surface. Also, ceramic materials have limited value for removal of heat from the first wall and limiter and must therefore be applied as thin coatings over a metallic substrate. The failure of such coatings and clad layers could represent a serious materials problem for the development of plasma devices. With metal surfaces, the metal may be selected for its structural strength, resistance to corrosion, and ease of fabrication. However, metallic surfaces limit the effectiveness of the plasma device because they generate substantial amounts of sputtered neutral atoms which are not retained on the surface and contaminate the plasma. In addition, some metals selected for stuctural properties have a high atomic number and the presence of their atoms in the plasma reduces the energy available for the thermonuclear reactions.

It has been suggested that the alkali and alkaline earth metals could be useful as components of the first wall and limiter. Since these metals are electropositive, they are potentially capable of providing a high secondary ion yield. However, these metals in the pure state do not possess the desired structural, fabricating, physical and chemical properties. In addition, a significant portion of the metal spattered from pure alkali metal surfaces in practice escapes as neutral atoms and not as secondary ions.

As metal is lost from the surface, the useful life for operating of the plasma device is reduced because a new first wall or limiter or new surfaces for these metallic members must be installed. Accordingly, improvements in the first wall and limiter of the plasma devices are desired.

One object of the invention is a first wall or limiter for a plasma device with a surface exhibiting reduced loss of metal by erosion and particularly by sputtering.

A second object of the invention is a first wall or limiter for a plasma device with a surface exhibiting an improved secondary ion/neutral ratio.

Another object of the invention is a first wall or limiter with means for replenishing metal on the surface exposed to plasma in a self-sustaining manner.

Yet another object is a first wall or limiter with a surface coating of a low atomic number.

An additional object of the invention is a first wall or limiter with reduced loss of structural metal.

These and other objects will become apparent from the detailed description below.

SUMMARY

By the invention, a metallic member exposed to plasma in a plasma device is provided with a surface having reduced loss of metal by erosion and particularly by sputtering. Further, the member is constructed primarily of a metal having desired structural and fabrication features together with a surface having an improved secondary ion/neutral ratio. In addition, a substrate is provided with desired structural and fabrication properties together with properties which provide a source of the surface metal as it is depleted or lost from the surface.

In the plasma device, the metallic member comprises a bulk portion or a metallic substrate composed of a first metal, and a thin surface layer composed of at least a major amount and advantageously a predominant amount in the order of at least 90 at.% of a second metal selected from the group consisting of alkali and alkaline earth metals and exhibiting a vapor pressure below the vapor pressure of the alkali or alkaline earth metal in its bulk form. Preferably, the surface layer consists essentially of the second metal with the surface layer being a monolayer and the atoms of the second metal in the surface being primarily bonded to atoms of the first metal. It is also preferred that the substrate include a portion of the second metal to serve as a source for replenishing metal on the surface lost during operation of the plasma device.

The invention further includes a substrate containing a mixture of first and second metals, including an alloy or crystalline compound, with further characteristics which enhance its effectiveness as a source of the second metal. In one process or method whereby the substrate serves as a self-sustaining source of surface metal for maintaining the surface, the substrate is composed of first and second metals in an alloy with the metals being selected to satisfy the equation $$H_{1,2} = \Omega + \tfrac{1}{2}(H_{1,1} + H_{2,2})$$

where $\Omega \leq 0$ and H represents the enthalpy of sublimation for the alloy and the pure first and second metals. With the alloy having these characteristics, a structural member, such as the first wall, composed of the alloy is heated to an elevated temperature or subjected to another energy source such as particle radiation sufficient to cause atoms of the second metal to become segregated at the surface and to form a high concentration of the second metal in a monolayer at the surface with a sharp decrease in concentration in the next layer below the surface. Beyond the second layer, the concentration returns to the bulk concentration. As the surface metal is lost during operation of the plasma device, the segregation effect transfers atoms of the second metal to the surface layer to maintain the surface. When the composition of metals in the mixture forms an intermetallic compound, segregation of the second metal becomes limited. However, a second process or method becomes effective to maintain the surface during operation of the plasma device. Initially, the surface of the structural member will have atoms of both the first and second metals. During bombardment by particles from the plasma, atoms of both metals escape from the surface, with those of the first metal being primarily neutrals. Since those escaping atoms of the second metal which have ionic bonds leave as secondary ions, they are returned to the surface by the electrical and magnetic fields of the plasma device. Further, since the surface binding energy between atoms of the first and second metals is higher than the energy for like atoms of the second metal, returning atoms of the second metal will seek vacant sites on the surface and form a monolayer which in some instances need not be atomically smooth.

BRIEF DESCRIPTION OF THE DRAWINGS

FIG. 5 is a pictorial representation of a substrate forming a second embodiment of the invention.

DETAILED DESCRIPTION OF THE INVENTION

Figure 1:
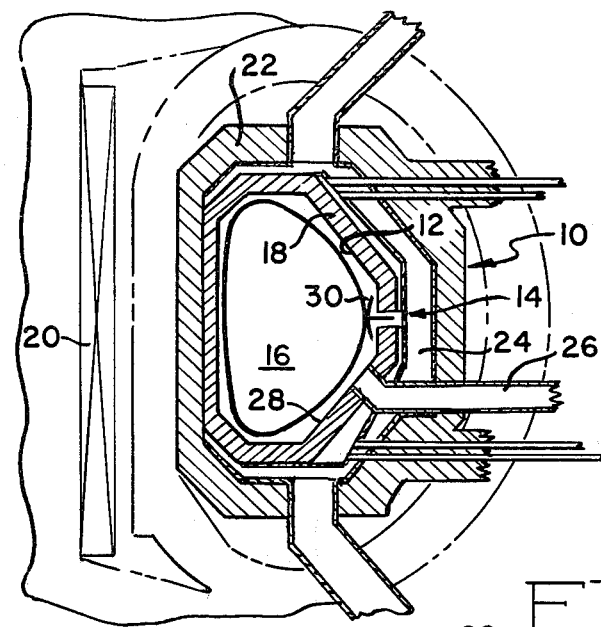
FIG. 1 is a cross sectional view of a representative plasma device.

The invention relates to a metallic member exposed to plasma in a plasma device and subject to a loss of metal from its surface by erosion and more specifically by sputtering. In the invention a metallic member such as a first wall or limiter is constructed of a substrate composed of a major amount of a first metal and a thin surface layer of a second metal. The term substrate is here construed as applying to any bulk material in which a surface has a composition or structure different from that of the bulk. In this metallic combination, less metal escapes from the surface than would occur when the second metal is in bulk form. In addition, the metal escaping from the surface has a higher secondary ion/neutral ratio and therefore a greater portion of the second metal leaving the surface is returned.

In another aspect of the invention, the substrate is composed of a major amount of a first metal and minor amount of a second metal so that the substrate provides a self-sustaining source of the second metal to the surface. Preferably the first metal is more electromegative than the second metal and the second metal is selected from the group consisting of alkali and alkaline earth metals, preferably those with low atomic number. Further, the metals are selected so that the binding energy between like atoms of the first metal is greater than the binding energy between atoms of the first and second metals which in turn is greater than the binding energy for like atoms of the second metal.

The substrate provides a self-sustaining source of the second metal by at least two processes. In the first, the metals are selected to satisfy the equation $$H_{1,2} = \Omega + \tfrac{1}{2}(H_{1,1} + H_{2,2})$$

where $\Omega \leq 0$, and H represents an enthalpy of sublimation for the alloy and the pure first and second metals. Under these conditions and when the substrate or structural member is heated to an elevated temperature or subjected to another energy source, the first or surface layer becomes enriched with the second metal to form a monolayer composed primarily of the second metal. Another mechanism which also causes segregation results from radiation damage.

In a second process when the substrate or structural member has a concentration of metals forming an intermetallic compound, the surface is subjected to an initial treatment of radiation including bombardment with particles. Since the second metal forms secondary ions in greater amounts than the first metal, the removal of the surface atoms results in a selective return of the second metal to form a monolayer of the second metal. Further, as the binding energy of like atoms of the second metal is below that for different atoms of the two metals, returning atoms of the second metal will move to vacant sites above atoms of the first metal and therefore aid in maintaining the monolayer of the second metal.

The invention provides several advantages. It provides a metallic member and particularly a first wall or limiter with a substrate constructed with a reasonable degree of structural strength and ease of fabrication, together with a surface having a reduced loss of metal by erosion or sputtering, and a higher secondary ion/neutral ratio. In addition, by providing a self-sustaining source of second metal for the surface of the first wall or limiter, the invention provides a surface with improved performance characteristics.

The invention is particularly useful in a plasma device in which a plasma is generated and heated to an elevated temperature. A number of plasma devices have been constructed to provide a means for conducting experiments in the field of thermonuclear reactions. FIG. 1 represents a sectional view of a plasma device 10 with a plasma 16 magnetically confined within a chamber 18. Additional parts of the plasma device as shown include the magnetic coil 20, a shield 22, a plenum chamber 24, and rf duct 26.

In the plasma device 10, hot plasma 16 at temperatures of about $1 \times 10^{8}\,°K$ is magnetically confined within the first wall 12 whose purpose is to limit the number of particles escaping from the plasma. The limiter 14 reinforces this purpose and is at a negative sheath potential of about 20–500 eV. The surface 28 of the first wall 12 and surfaces 30 of the limiter 14 are both subject to erosion by loss of metal due to vaporization of the metal at the elevated temperature of 300°–3500° C. and also by sputtering. Sputtering may occur when particles from the plasma strike the metallic surfaces 28 and 30. If the sputtered particles are secondary ions, they are returned to the emitting surface by the toroidal field regardless of charge sign. If the secondary ions are emitted from the limiter, or the wall in a limiter-less device, the sheath potential provides an additional means of returning the positive ions which comprise the vast majority of the secondary ions. If the sputtered particles are neutral and depending on their kinetic energies, they will penetrate sufficiently far into the plasma for charge exchange collisions to occur. At that point, they will become ionized but the ions will then be subject to plasma transport processes and some of the particles will therefore tend to continue into the plasma causing a reduction in the plasma energy available for the desired thermonuclear reactions.

Figure 2:
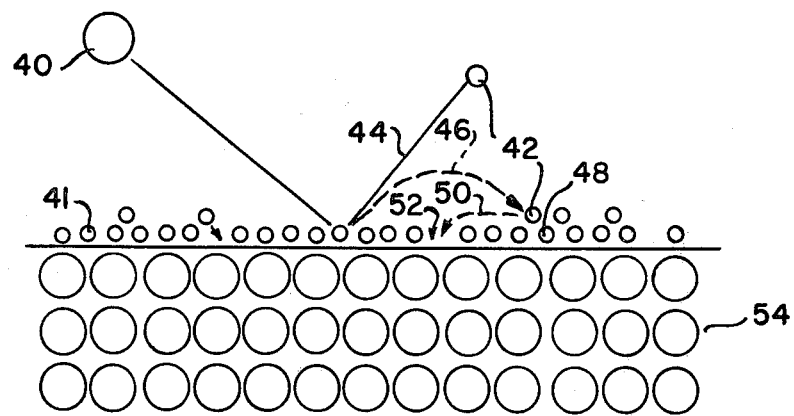
FIG. 2 is a pictorial representation of an enlarged form of a section of the first wall of a plasma device wherein the first wall represents one embodiment of the invention.
Figure 3:
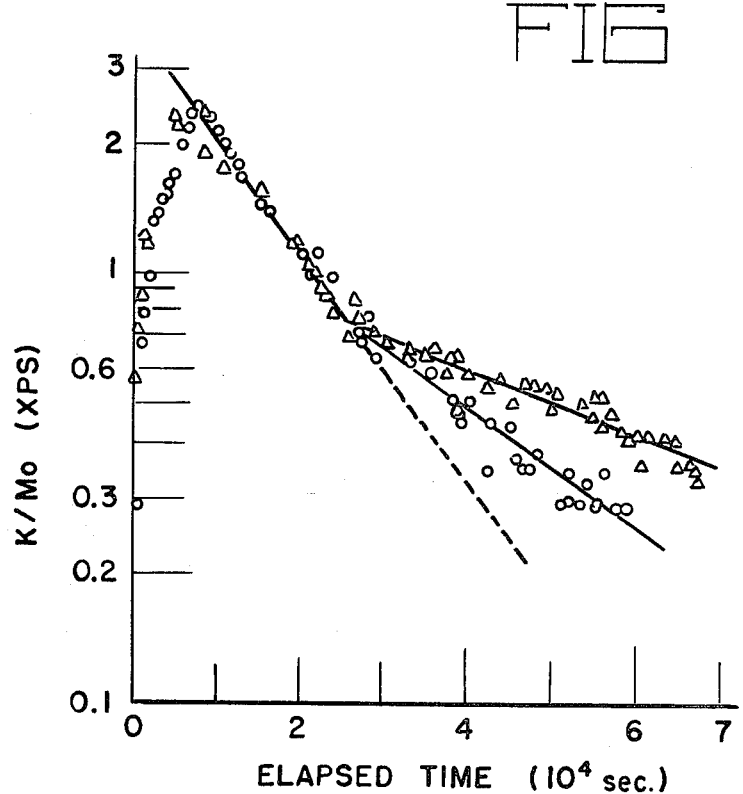

In the inventive metallic member represented by the first wall 12 and limiter 14, each pair of different atoms of the first and second metals have a binding energy above the value for like atoms of the second metal and therefore are at a reduced vapor pressure from their pressure in bulk form. This results in a reduced loss from the surface of the wall or limiter. Preferably the surface layer is a monolayer composed of atoms of the second metal with ionic bonds to atoms of the first metal as generally illustrated in FIG. 2. The presence of the monolayer also serves to shield the substrate from sputtering, especially under the conditions of low energy-light ion sputtering encountered in plasma devices. Therefore, the erosion of the substrate metal which produces predominantly neutral atoms which have a relatively high likelihood of entering the plasma is reduced. In addition, returning atoms of the second metal will have a greater affinity towards atoms of the first metal due to the higher binding energies and will move to vacancies in the monolayer where atoms of the first metal are exposed thereby maintaining the integrity of the monolayer.

As illustrated in FIG. 2, a particle 40 from the plasma 16 strikes the surface 41 of the wall 12 or limiter 14 and causes an atom 42 of the second metal to leave the surface 41. That atom may move in two paths 44 and 46 depending on whether or not the atom is attracted to the surface 41 by the sheath potential or magnetic field. In some instances, the atom 42 will initially move to a position over a like atom 48 before it moves along path 50 to a vacant site 52. Substrate 54 is illustrated as containing only molybdenum although as disclosed below, minor amounts of the second metal may be present to provide a self-regenerating and self-sustaining surface of the second metal.

The surface metal or second metal is an alkali or alkaline earth metal including Li, Na, K, Rb, Cs, Mg, Ca, Sr, and Ba with those with a lower atomic number having an advantage since their effect on reduction in energy of the plasma is less than those metals with greater atomic number. However, a heavier metal such as cesium has advantages since it may provide a higher ion fraction than lithium.

The metal comprising the major portion of the substrate is more electronegative than the surface metal, has preferably a high melting point relative to the second metal, a high solubility for the second metal, a high surface binding energy, and a high heat of sublimation. Suitably, a first metal includes Al, Si, Cu, Au, B, Mg, Pb, Bi, C, Ag and Ca, and may form either an alloy or intermetallic compound with the second metal. In the case of the compound, it should be noted that the melting point of the compound may be higher than that of either element, and that it is the compound's melting point that, in fact, determines the suitability for use in a plasma device. The first metal will be more electronegative than the alkali or alkaline earth second metal. The substrate may include combinations of the first metal such as stainless steel formulations, particularly when the self-sustaining feature is not utilized.

When the substrate is intended to provide a source of the second metal, and the substrate is in the form of an alloy, the second metal may be present in quantities as low as a few ppm, with preferred upper limit of about 20 at.%. For the process involving selective erosion of an intemetallic compound (e.g., $Li_2Si$ or $BaAl_4$) the second metal should constitute from about 15 at.% to about 70 at.% and preferably about 50 at.%.

When the substrate is compound of a mixture of metals forming an alloy, the metals are selected to satisfy the equation $$H_{1,2} = \Omega + \tfrac{1}{2}(H_{1,1} + H_{2,2}).$$

The above equation is further described by Williams and Nason in the reference Surface Science, 45, (1974) 377. Briefly, the equation relates the enthalpy ($H_{1,2}$) of the sublimation for the alloy and first and second metals in terms of the solution parameter "$\Omega$" which equals zero for an ideal solution. When $\Omega \leq 0$, the second metal in the alloy becomes segregated to form essentially a monolayer on the surface. In this process continuing as the surface is eroded, the surface is maintained with added amounts of the second metal.

Figure 4:
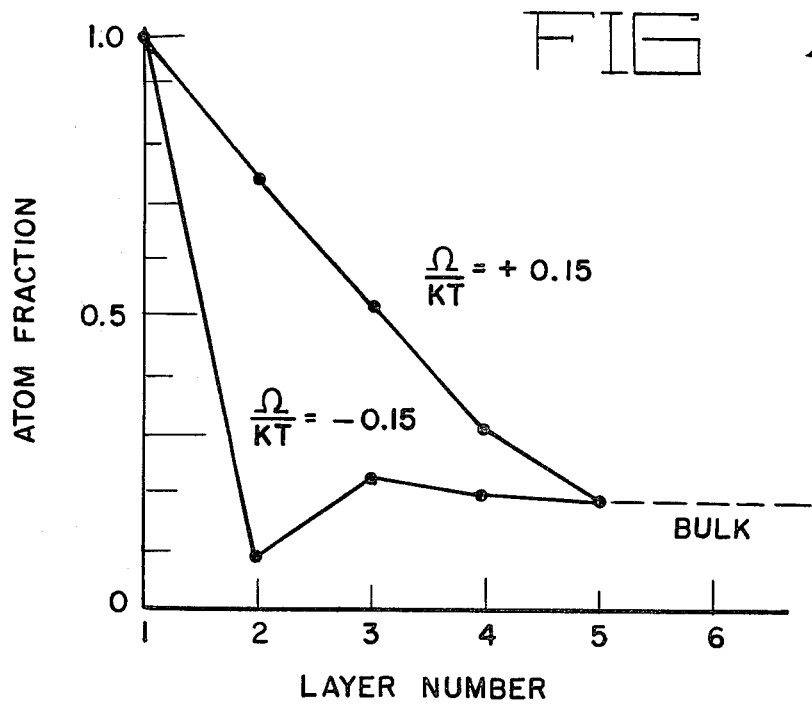
FIG. 4 is a graph showing the difference in concentration in various layers of a metallic composition under described conditions.

As further illustrated in FIG. 4 which represents a graph characterizing the effect of the selection of metals satisfying the above equation; when $\Omega$ is negative, the concentration of the minor constituent is highest at the first layer and decreases to a very low value in the second layer after which it returns to the bulk value. The final difference in concentration between the first and second layers results in a more stable condition than would be associated with random distribution of the second metal in the substrate. As also illustrated in FIG. 4, when $\Omega$ is positive, the extreme difference in concentration of the second metal between the first and second layers does not occur. When $\Omega$ is negative, the effect illustrated in FIG. 4 is achieved by providing a mixture of metals as described above and applying energy to the substrate sufficient to cause the atoms of the second metal to migrate and form a surface layer composed predominantly of the second metal with a second layer having a greatly decreased concentration of the second metal. Preferably, the energy is applied by heating the substrate to an elevated temperature at least about 300° C. and preferably about 300°-600° C. As the surface layer loses atoms of the second metal and with the substrate at an elevated temperature, atoms of the second metal are transferred to the surface by segregation to maintain the concentration difference between the first and second layers.

Another process by which atoms of the second metal are transferred or migrate in the substrate is associated with a radiation-induced segregation. In this process, voids or other sites are created in the substrate by radiation damage and atoms of the second metal move with these sites to the surface to provide atoms of the second metal on the surface.

As illustrated in the pictorial representation of a substrate in FIG. 5 containing an alloy 60 forming segregated layers, the surface 62 of first layer 64 is a monolayer of the second metal 66 such as potassium with the next below layer 68 comprising the first metal 70 such as aluminum with a small amount of the second metal 66. Additional layers 72 and 74 are composed of the first metal with the second metal being present in approximately the bulk concentration.

In some instances, the combination of the first and second metals will result in an intermetallic compound where the atoms of the second metal are relatively fixed in the structure. Illustrations of these compounds are $BaAl_4$, $Li_2Si$, $Li_5B_4$ $Li_3Bi$, and $Li_4Ca$. Under these combinations, the substrate will provide the desired surface layer by selective removal of atoms of the first metal from the surface. Since atoms of the first metal will escape from the surface as neutrals, the second metal will increase in concentration at the surface due to the return of atoms of the second metal as secondary ions to the surface. The selective removal of the first metal from the surface is carried out by subjecting the substrate to an initial bombardment stage. After the formation of the surface layer of the second metal, some amounts of the second metal will be lost during operation of the plasma device. Returning atoms of the second metal under the effects of the electrical and/or magnetic fields will reform the surface over atoms of the first metal. In addition, exposed atoms of the first metal will be removed by bombardment so that the surface layer will continue to be characterized by a predominance of the second metal. For purposes of illustration, the surface of the intermetallic compound at the initial stage may be represented as follows:

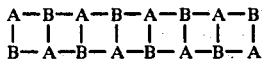

where "A" and "B" represent atoms of the second and first metals. As "B" is selectively removed, a layer of "A" remains to form a monolayer.

EXAMPLES I-II

Two tests were conducted on the sputtering behavior of a layer of potassium on molybdenum. The equipment included a bakeable, ion pumped stainless steel UHV sample chamber in which is installed commercial Auger electron (AES) and x-ray photoemission (XPS) spectrometers, a differentially pumped 5 KeV ion gun, and a laboratory-constructed secondary ion mass and energy analyzer. The ion gun has been modified so that an internal pressure readout signal can be provided to the servo-controlled gas inlet valve to obtain pressure stabilization. Electron and ion beam currents were measured by a Faraday cup which can be moved into the sample position. The ion gun was capable of producing a beam spot 200 $\mu$m in diameter and the beam was rastered over an area larger than the sample to avoid effects arising from beam nonuniformity. Ion beam current densities ranged from about 0.7 to 10 $\mu$ $A/cm^2$.

A potassium layer was produced from a source constructed of a porous tungsten plug impregnated with a potassium alumino-silicate analogous to a commerical molecular sieve. When heated, the source emitted potassium ions. The source was placed approximately 10 cm from the sample to reduce surface heating, and a molybdenum heat shield and collimator with a 6 cm diameter aperture was placed approximately equidistant between the source and sample. A bias of about 45 volts was applied to the source during deposition to supply an extraction potential. The spectrometers, ion gun and potassium source were positioned so that it was possible to deposit, sputter and operate all of the analyzers without changing the sample position.

Potassium deposition on the molybdenum substrate was monitored either by AES or XPS. Because of the power radiated by the potassium source, the sample temperature increased to about 90°-100° C. during deposition. At this temperature, bulk potassium is above its melting point and has a vapor pressure of about $10^{-4}$ Torr. The time for the deposition of potassium was about two hours and the potassium signal was normalized to the Mo line intensity for each scan to correct for fluctuations in the output of the x-ray tube. After about two hours, the potassium source and sample bias were turned off and a 1 KeV $He^+$ beam was turned on. The potassium signal fell at a constant rate for several hours, followed by an abrupt change to a new, slower rate indicating that less potassium was escaping from the surface. The data in FIG. 3 obtained without sample bias are indicated by the symbol "0". The test was then repeated under the same conditions except that a bias of about $-21$ volts was applied to the sample. An identical or near identical initial sputtering rate and the same abrupt change were noted; however, the erosion rate following the abrupt change was lower than in the previous test. For this test, the data are indicated by the symbol "$\Delta$".

Figure 3:
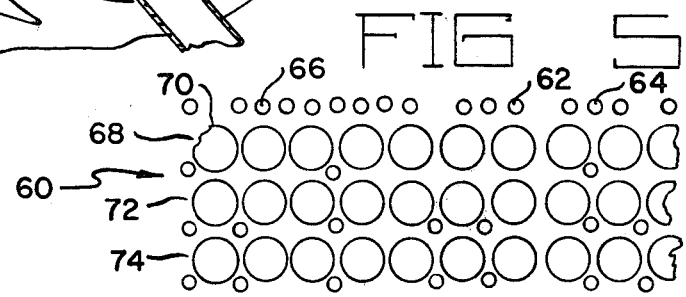
FIG. 3 is a graph of data obtained in Examples I and II as described herein.

The results of the tests are shown in FIG. 3. As indicated, the initial sputtering resulted in the removal of potassium as neutral atoms until a monolayer was formed (as calibrated by AES). After the monolayer was formed, potassium ions on the surface escaped as secondary ions in the absence of an applied potential. In the second test, when the negative potential of about 21 eV was applied to the sample, the rate became further reduced due to the return of secondary ions to the surface. In addition to the rates shown in FIG. 3, the sputtering cross section in FIG. 3 was measured. The initial sputtering cross section was about $6.6 \times 10^{-18}$ $cm^2$, with values for the lower line representing the test without bias being about $3.6 \times 10^{-18}$ $cm^2$ and for the lower line representing the test with bias being about $1.9 \times 10^{-18}$ $cm^2$.

The embodiments of the invention in which an exclusive property or privilege is claimed are defined as follows:

1. In a plasma device, a metallic member exhibiting reduced erosion when exposed to plasma at an elevated temperature, the member comprising: a metallic substrate composed of a first metal and a protective thin surface layer on the substrate, the surface layer comprising at least about 90 atomic percent of a second metal selected from the group consisting of alkali and alkaline earth metals, the first metal being more electronegative than the second metal, the surface layer being characterized by atoms of the second metal having ionic bonds to atoms of the first metal in the substrate and forming a higher ratio of secondary ions to neutrals than atoms of the second metal in bulk form when exposed to said plasma, and the binding energy between atoms of the first and second metal being below the binding energy between like atoms of the first metal and above the binding energy between like atoms of the second metal.

2. In a plasma device, the member of claim 1 wherein surface layer is a monolayer.

3. In a plasma device, the member of claim 1 wherein the second metal is an alkali metal.

4. In a plasma device, the member of claim 3 wherein the second metal is lithium.

5. In a plasma device, the member of claim 3 wherein the second metal is potassium.

6. In a plasma device, the member of claim 3 wherein the second metal is cesium.

7. In a plasma device, the member of claim 1 wherein the second metal is an alkaline earth metal.

8. In a plasma device, the member of claim 7 wherein the second metal is barium.

9. In a plasma device, the member of claim 1 wherein the first metal is aluminum.

10. In a plasma device, the member of claim 3 wherein the first metal is gold.

11. In a plasma device, the member of claim 1 wherein the substrate is composed of the first metal in a major amount and the second metal in a minor amount, the second metal migrating to the surface during exposure of the surface to said plasma to replenish second metal lost by erosion.

12. In a plasma device, the member of claim 11 wherein a portion of the second metal is adjacent the surface layer.

13. In a plasma device, the member of claim 11 wherein the minor amount ranges from a small yet effective amount to about 20 at.%.

14. In a plasma device, a metallic member exhibiting reduced erosion when exposed to plasma at an elevated temperature, the member comprising a bulk portion composed of first and second metals, and a surface layer composed of a second metal, a portion of the second metal on the surface being lost during exposure to said plasma, and the bulk portion providing second metal at said surface to reform said surface layer.

15. In a plasma device, the metallic member of claim 14 wherein said second metal is selected from the group consisting of an alkali metal and barium and is capable of producing a high secondary ion yield when exposed to particle radiation.

16. In a plasma device, the metallic member of claim 14 wherein said second metal has a low atomic number and is selected from the group consisting of lithium, sodium, and potassium.

17. A method of providing a self-sustaining surface of a metallic member in a plasma device, comprising the steps of: providing a structural member composed of an alloy of first and second metals, the first metal being more electronegative than the second metal with the second metal being selected from the group consisting of alkali and alkaline earth metals, the first and second metals having a binding energy between different atoms above the energy for like atoms of the second metal and below the energy for like atoms of the first metal, and applying energy to the structural member sufficiently to cause atoms of the second metal to migrate to form a surface layer predominantly of the second metal and an underlying substrate.

18. The method of claim 17 wherein the step of applying energy is carried by applying heat to heat the substrate to an elevated temperature.

19. The method of claim 18 wherein the first and second metals satisfy the equation $$H_{1,2} = \Omega + \tfrac{1}{2}(H_{1,1} + H_{2,2})$$

where $\Omega \leq 0$ and H is the enthalpy associated with the heat of sublimation of the alloy and of the first and second metals.

20. The method of claim 19 which includes the steps of exposing the first layer to plasma during which atoms of the second metal escape from the first layer, and continuing to apply energy to the substrate to cause atoms of the second metal in the substrate to migrate to the first layer.

21. The method of claim 20 which includes the step of providing an electromagnetic field to return a portion of the escaping atoms of the second metal to the surface layer.

22. A method of providing a self-sustaining surface of a metallic member in a plasma device, comprising the steps of: providing a structural member composed of an intermetallic compound of a first metal and a second metal, the first metal being more electronegative than the second metal with the second metal being present in an amount not greater than about 70 at.%, and exposing the surface to plasma to selectively sputter atoms of the first metal to escape the surface thereby leaving a layer of the second metal and an underlying substrate collectively forming the metallic member.

* * * * *